United States Patent
Huang et al.

(10) Patent No.: US 7,542,820 B2
(45) Date of Patent: Jun. 2, 2009

(54) METHODS AND ARRANGEMENT FOR CREATING RECIPES USING BEST-KNOWN METHODS

(75) Inventors: Chung-Ho Huang, San Jose, CA (US); Shih-Jeun Fan, San Jose, CA (US); Chin Chuan Chang, Los Altos, CA (US); Nicolas Bright, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 259 days.

(21) Appl. No.: 11/536,582

(22) Filed: Sep. 28, 2006

(65) Prior Publication Data
US 2008/0188970 A1  Aug. 7, 2008

(51) Int. Cl.
*G06F 19/00* (2006.01)
(52) U.S. Cl. ...................................... 700/104
(58) Field of Classification Search ................ 700/87, 700/89, 103, 104
See application file for complete search history.

(56) References Cited

U.S. PATENT DOCUMENTS

| | | | |
|---|---|---|---|
| 6,415,193 B1* | 7/2002 | Betawar et al. | 700/97 |
| 7,213,478 B2* | 5/2007 | Harada et al. | 73/865.9 |
| 7,305,320 B2* | 12/2007 | Ahmed et al. | 702/155 |
| 7,328,418 B2* | 2/2008 | Yamashita et al. | 716/10 |
| 2004/0158484 A1* | 8/2004 | Tu et al. | 705/7 |
| 2004/0243267 A1* | 12/2004 | Tu et al. | 700/105 |
| 2006/0184264 A1* | 8/2006 | Willis et al. | 700/108 |

FOREIGN PATENT DOCUMENTS

| | | | |
|---|---|---|---|
| JP | 09139331 A | | 5/1997 |
| JP | 15100585 A | | 4/2003 |
| JP | 2003100585 | * | 4/2003 |

OTHER PUBLICATIONS

Whitefield et al. "Best-Known Methods for Driving Yeild Fabwide"; May 1, 2005; LSi Logic Corporation; Smeiconductor International pp. 1-15.*
"Written Opinion", Issue in PCT Application No. PCT/US2007/079770; Mailing Date.: Jan. 16, 2008.
"International Search Report", Application No. PCT/US2007/079770; Correspondence Date: Jan. 16, 2008.
"Written Opinion", Issue in PCT Application No. PCT/US2007/079770; Mailing Date.: Jan. 16, 2008.
"International Search Report", Application No. PCT/US2007/079770; Correspondence Date: Jan. 16, 2008.

* cited by examiner

*Primary Examiner*—Albert DeCady
*Assistant Examiner*—Chad Rapp
(74) *Attorney, Agent, or Firm*—IP Strategy Group, P.C.

(57) ABSTRACT

A method for affecting a creation of a recipe for processing a substrate in a processing system. The method includes providing a best-known method driven recipe editor. The best-known method driven recipe editor incorporates best-known methods (BKMs), which are best practice specifications for the recipe. The method also includes creating a plurality of BKM modules based on the BKMs for the recipe. The method further includes defining rules for parameters in the plurality of BKM modules. The rules are propagated by the BKMs. The methods moreover includes creating a BKM driven recipe by employing the best-known method driven recipe editor to enter values for the parameters within the guidelines of BKM rules.

29 Claims, 7 Drawing Sheets

| Page: | Setpoints | | Created: | 10/24/2005 2:12:24 pm | Author: | system | | | Open | Restore |
|---|---|---|---|---|---|---|---|---|---|---|
| Recipe Name: | DispensePattern1 | | Modified: | 10/24/2005 2:58:11 pm | Owner: | system | | | New | Save |
| Comment | | | | | | | | | Close | Save as |
| | | | | | | | | | Delete | Save to |

| Parameter | 1 | 2 | 3 | 4 | 5 |
|---|---|---|---|---|---|
| Step Description | | | | | |
| Process Time (secs) | 0 | 0 | 0 | | |
| Head Pair 1 Enable | Enable | Enable | Enable | Enable | |
| Head Pair 1 Top DIW Flow | Off | Off | Off | Off | |
| Head Pair 1 Bottom DIW Flow | Off | Off | Off | Off | |
| Head Pair 1 IPA/N2 Flow | 0.0 | 0.0 | 0.0 | 0.0 | |
| Head Pair 1 IPA Concentration | Off | Off | Off | Off | |
| Head Pair 1 Vacuum | St1Head1IPA | 0.0 | 0.0 | 0.0 | |
| Head pair 1 IPA Direction | Forward | Forward | Forward | Forward | |
| Head Pair 2 Top Chem 2 Flow | Off | Off | Off | Off | |
| Head Pair 2 Top Chem 3 Flow | Off | Off | Off | Off | |
| Head pair 2 Bottom DIW Flow | Off | Off | Off | Off | |
| Head Pair 2 Vacuum | Off | Off | Off | Off | |
| Head Pair 2 Toggle Zone A | Off | Off | Off | Off | |
| Head Pair 2 Toggle Zone B | Off | Off | Off | Off | |
| Head Pair 2 Toggle Zone C | Off | Off | Off | Off | |
| Head Pair 2 Toggle Zone D | Off | Off | Off | Off | |
| Head Pair 2 Toggle Zone E | Off | Off | Off | Off | |
| Head Pair 3 Top DIW Flow | Off | Off | Off | Off | |
| Head Pair 3 Bottom DIW Flow | Off | Off | Off | Off | |
| Head Pair 3 IPA/N2 Flow | Off | Off | Off | Off | |

FIGURE 4

| BKM Type: | DispensePattern | | Created: | 10/24/2005 3:02:24 pm | | Author: | system | |
|---|---|---|---|---|---|---|---|---|
| Page: | Setpoints | | Modified: | 10/24/2005 3:10:11 pm | | Owner: | system | |
| BKM Name: | DisPatTest | | Comment: | | | | | |

| Parameter | 1 | 2 | 3 | 4 | 5 |
|---|---|---|---|---|---|
| StepDescription | | | USerBKM | | |
| HeadPair1Enable | Exact | Exact | Default | Default | Default |
| HeadPair1TopDIWFlow | Default | UserBKM | Default | Default | Default |
| HeadPair1BottomDIWFlow | | Exact | Default | Default | Default |
| HeadPair1IPAN2Flow | | Exact | Default | Default | Default |
| HeadPair1IPAConcentration | | UserBKM | Default | Default | Default |
| HeadPair1Vacuum | | UserRecipe | Default | Default | Default |
| HeadPair1IPADirection | | Previous | Default | Default | Default |
| HeadPair2TopChem2Flow | | Custom | Default | Default | Default |
| HeadPair2TopChem3Flow | | Exact | Default | Default | Default |
| HeadPair2BottomeDIWFlow | | Custom | Default | Default | Default |
| HeadPair2Vacuum | | Previous | Default | Default | Default |
| HeadPair2ToggleZoneA | | Default | Default | Default | Default |
| HeadPair2ToggleZoneB | | Default | Default | Default | Default |
| HeadPair2ToggleZoneC | | Default | Default | Default | Default |
| HeadPair2ToggleZoneD | | Default | Default | Default | Default |
| HeadPair2ToggleZoneE | | Default | Default | Default | Default |
| HeadPair3TopDIWFlow | | Default | Default | Default | Default |
| HeadPair3 BottomDIWFlow | | Default | Default | Default | Default |
| HeadPair3IPAN2Flow | | Exact | Default | Default | Default |

BKM Parameter Rule Editor

Step Number: 1
Default Value: 0

524

OK    Cancel

Open  Restore
New   Save
Close Save as
Delete Save to

FIGURE 5

METHODS AND ARRANGEMENT FOR CREATING RECIPES USING BEST-KNOWN METHODS

BACKGROUND OF THE INVENTION

Advances in plasma and cleaning processing have facilitated the growth in the semiconductor industry. In plasma processing, different recipes may be utilized to perform substrate processing. Recipes are generally complex and require the users, such as process engineers, to not only be knowledgeable about the recipes but also about the processing system hardware that execute the recipes. As discussed herein, a processing system may include, but are not limited to, a plasma processing system and a cleaning processing system.

A method that may be commonly employed to create a recipe is the process of manually entering values onto a tabular document, such as a large monolithic spreadsheet (LMS). The LMS allows users the flexibility to enter and change values. However, the LMS may be unduly large in terms of the number of values that may be gathered. Typically, a recipe may include about 50 steps. For each step, about 250 parameters (e.g., bias power, top power, chamber pressure, type of gas, etc.) may be defined. In addition, for each parameter, the user may have to enter 3 values: setpoint, soft tolerance, and hard tolerance. Thus, for a typical recipe, about 30,000 to 40,000 values may have to be manually entered by the user.

To facilitate discussion, FIG. 1 shows a simplified diagram of a production environment utilizing a manual tabular recipe document. After a recipe has been entered onto a LMS 102, LMS 102 is uploaded via a path 108 onto a process control module (PCM) 104, such as a computer, that may control a processing system hardware 106. PCM 104 may send parameters for each step via a path 10 from LMS 102 to processing system hardware 106. Processing system hardware 106 may utilize the parameters from LMS 102 to process a substrate. As a recipe step is completed, plasma processing hardware 106 may send data request via a path 112 to PCM 104 to retrieve the next step in the recipe.

Since the data on LMS 102 are manually entered by the user, the process may be prone to human error. In order for the user to ensure that accurate values are being supplied, the user may have to possess the skills and knowledge about the recipe and processing system hardware. Also, the overwhelming number of values that the user may have to supply in the creation of the recipe may provide opportunities for wrong values to be entered. Further, LMS 102 may not be protected, enabling the user or someone else to add or delete parameters. Thus, the user may enter erroneous data causing costly substrate waste. One skilled in the art is aware that "bad recipes," such as recipes with invalid data, account for more than half of the costly substrate waste in some production environments.

In addition, the process of entering data into LMS 102 may not be integrated with processing system hardware 106. Thus, even a user who may be proficient in creating recipes, in general, may have a difficult time determining whether the values entered onto LMS 102 are compatible with the configuration settings of processing system hardware 106. Consequently, a recipe that is incompatible with the configuration settings of the processing system hardware may cause sever damages to expensive hardware.

To minimize the risk of human error, some substrate manufacturers may employ a method of hard-coding the recipes. However, this method provides users with little or no flexibility for making legitimate changes to the recipes. Instead, updates to the recipes may generally require time-consuming and/or costly software code changes. There are several disadvantages associated with prior art methods of creating recipes. For example, recipes that have been hard-coded require software supports that make updates and adjustments to recipes a burdensome process. On the other hand, manual LMS provide users with the flexibility of entering the data, but presents many opportunities for erroneous data entry.

SUMMARY OF INVENTION

The invention relates, in an embodiment. to a method for affecting a creation of a recipe for processing a substrate in a processing system. The method includes providing a best-known method driven recipe editor. The best-known method driven recipe editor incorporates best-known methods (BKMs), which are best practice specifications for the recipe. The method also includes creating a plurality of BKM modules based on the BKMs for the recipe. The method further includes defining rules for parameters in the plurality of BKM modules. The rules are propagated by the BKMs. The methods moreover includes creating a 8KM driven recipe by employing the best-known method driven recipe editor to enter values for the parameters within the guidelines of BKM rules.

In another embodiment, the invention relates to an arrangement for affecting a creation of a recipe for processing a substrate in a processing system. The arrangement includes a best-know method driven recipe editor, the best-known method driven recipe editor incorporating best-known methods (BKMs), which are best practice specifications for the recipe. The arrangement also includes a plurality of BKM modules based on the BKMs for the recipe. The arrangement further includes rules for defining parameters in the plurality of BKM modules. The rules are propagated by the BKMs.

In yet another embodiment, the invention relates to an article of manufacture comprising a program storage medium having computer readable code embodied therein. The computer readable code is configured to create a recipe for processing a substrate in a processing system. The article of manufacture also includes computer readable code for creating a best-know method driven recipe editor. The best-known method driven recipe editor incorporates best-known methods (BKMs), which are best practice specifications for the recipe. The article of manufacture further includes computer readable code for creating a plurality of BKM modules based on the BKMs for the recipe. The article of manufacture moreover includes computer readable code for applying rules in defining parameters in the plurality of BKM modules. The rules are propagated by the BKMs.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 shows, in an embodiment, an example of a value view of a BKM driven recipe editor interface.

FIG. 5 shows, in an embodiment an example of a rule view of a BKM driven recipe editor.

DETAILED DESCRIPTION OF EMBODIMENTS

Figure 1:
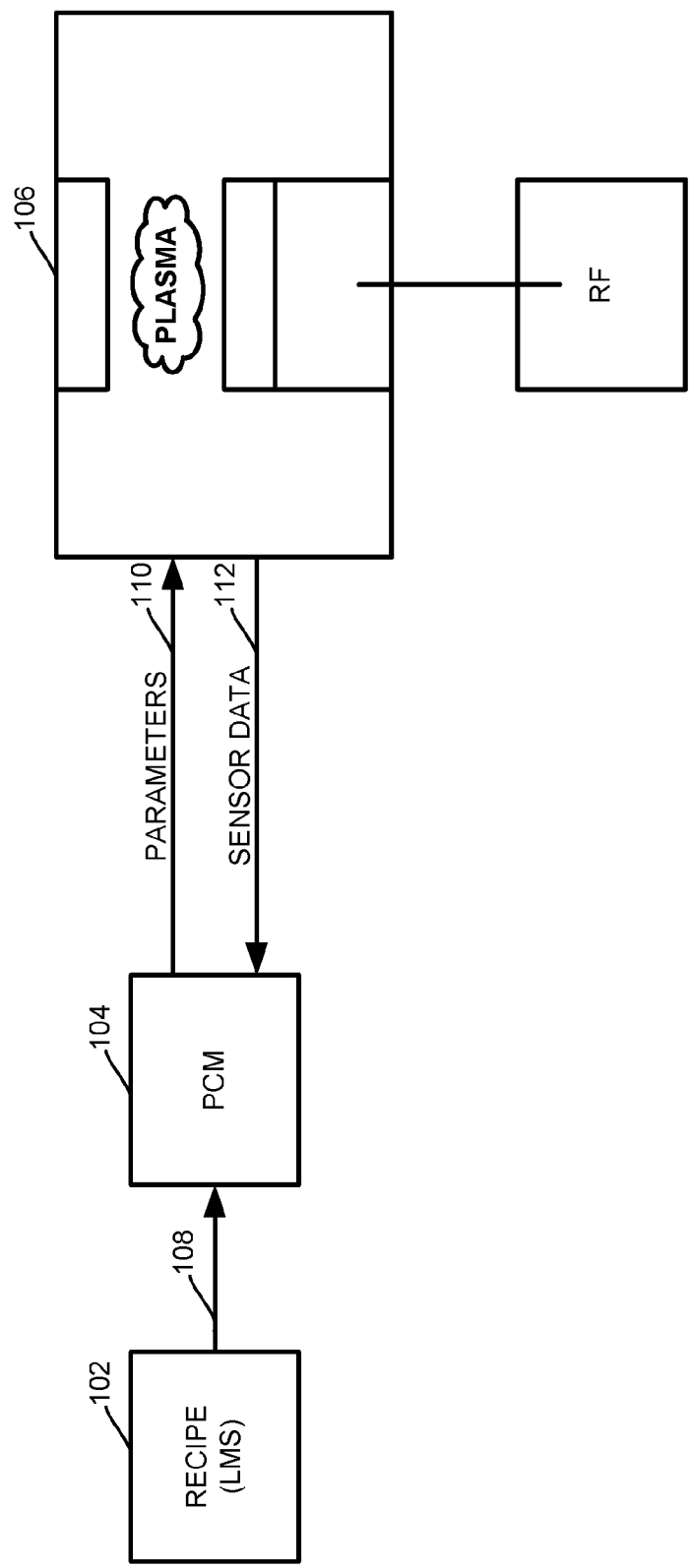
FIG. 1 shows a simplified diagram of a production environment utilizing a manual tabular recipe document.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there is provided a best known method driven recipe editor designed to incorporate best-known methods (BKMs) while providing users the flexibility of entering and adjusting values for a given recipe. As discussed herein, BKMs refer to best practices for creating a recipe for a processing system hardware. As discussed herein, a processing system may include, but are not limited to, a plasma processing system and a cleaning processing system. In embodiments of the invention, BKMs for each recipe may be encapsulated within one or more BKM modules. Embodiments of the invention further provide methods and arrangements for experts to modify existing BKM modules and create new BKM modules via the BKM driven recipe editor. As discussed herein, an expert refers to a person who has been granted editor privileges for creating new BKM modules or modifying current BKM modules.

In this document, various implementations may be discussed using plasma processing system. This invention, however, is no limited to a plasma processing system and may include cleaning system. Instead, the discussions are meant as examples and the invention is not limited by the examples presented.

In an embodiment, each BKM module may relate to a particular stage of a process and may include one or more steps of a recipe. In an example, a recipe with 50 steps may now be modularized into functional blocks and be associated with 10 BKM modules, with each BKM module being associated with at least one step.

In creating a recipe, a user may utilize a BKM driven recipe editor to call forth one or more BKM modules. In an embodiment, the BKM modules may specify rules for permissible values for each parameter. Also, rules may be used to define dependency between parameters. In an example, the values that may be entered for a pressure parameter may determine the ranges that may be entered for a bias power parameter. Further, updates to best practices for a recipe may be propagated via updated BKMs and may be translated into new rules for parameters of a BKM module. In an embodiment, the rules may be automatically updated when said BKMs are updated. Hence, in creating a recipe a user may enter or change values, but a user may not have the permission to change rules.

In an embodiment of the invention, the BKM driven recipe editor may incorporate recommended configuration settings for a processing system hardware in the creation of a recipe. Further, prior to executing the recipe, the user-provided configuration settings for the processing system hardware may be compared against the BKM driven recipe to determine compatibility, thereby preventing expensive damages to the hardware.

In some circumstances, substrate manufacturers may have proprietary recipes that may not be accommodated by the provided BKM modules. As discussed herein, a proprietary recipe refers to a recipe that may have steps or parameters that deviate from best practices adopted by many in the field. In an embodiment, experts associated with the tool owner who wished to retain the proprietary nature of their recipe may be granted permission to modify or create BKM modules using the BKM driven recipe editor. These BKMs are thus proprietary to that tool only and not propagated to other tool owner (e.g., competing chip-maker).

Figure 2:
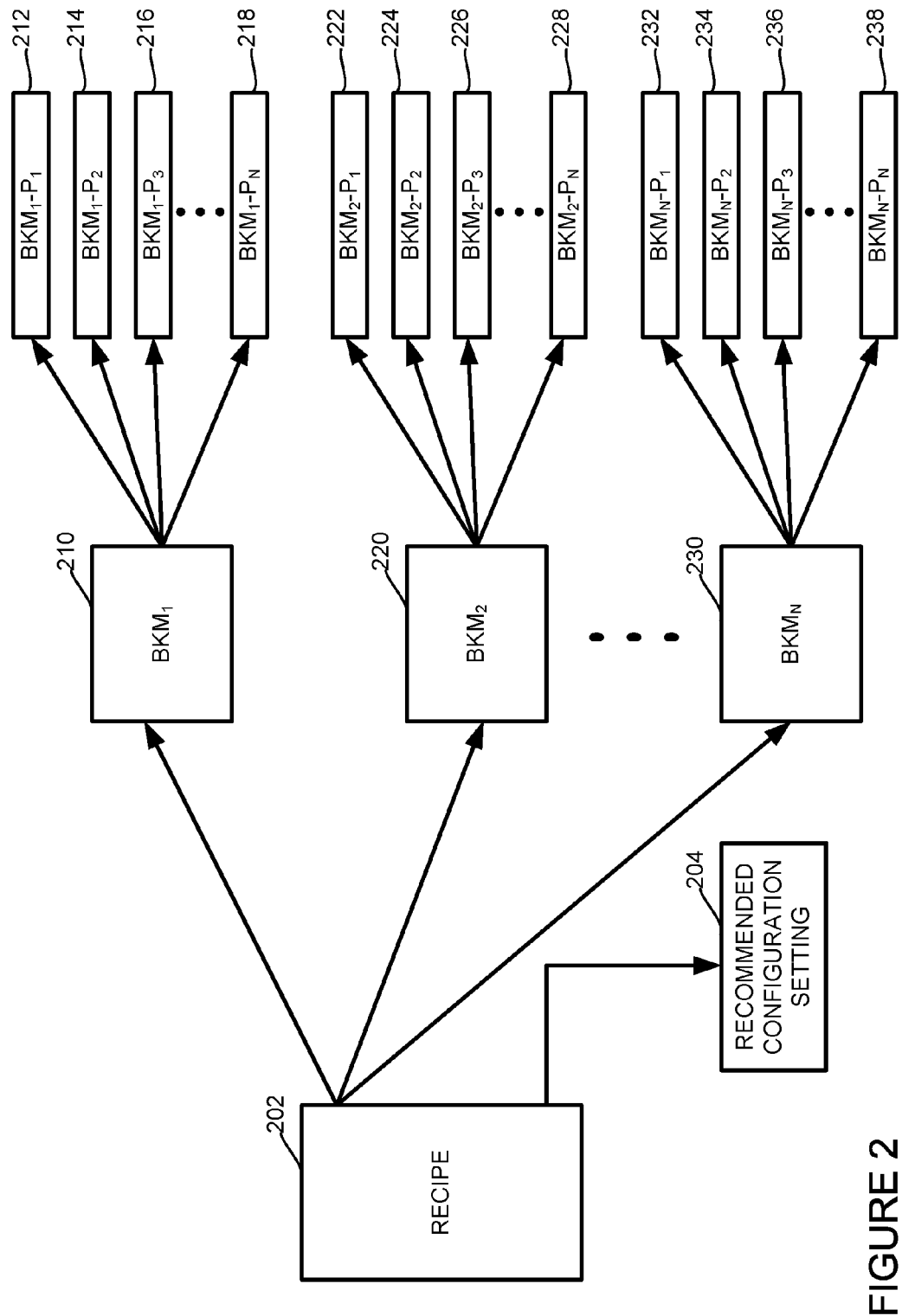
FIG. 2 shows, in an embodiment, a simple diagram of a recipe with a plurality of BKM modules.

The features and advantages of embodiments of the invention may be better understood with reference to the figures and discussions that follow. FIG. 2 shows, in an embodiment, a simple diagram of a recipe associated with a plurality of BKM modules. A multi-steps monolithic recipe 202 may be modularized into a plurality of functional blocks, which may be associated with a plurality of BKM modules (210, 220, and 230). Each BKM module may have a plurality of parameters (212-218, 222-228, and 232-238). In an embodiment, each parameter may be controlled by rules which may define the permissible values that may be entered for each cell. In addition, each cell may have default value suggestion. Further each BKM module may have recommended configuration settings for the processing system hardware.

Figure 3:
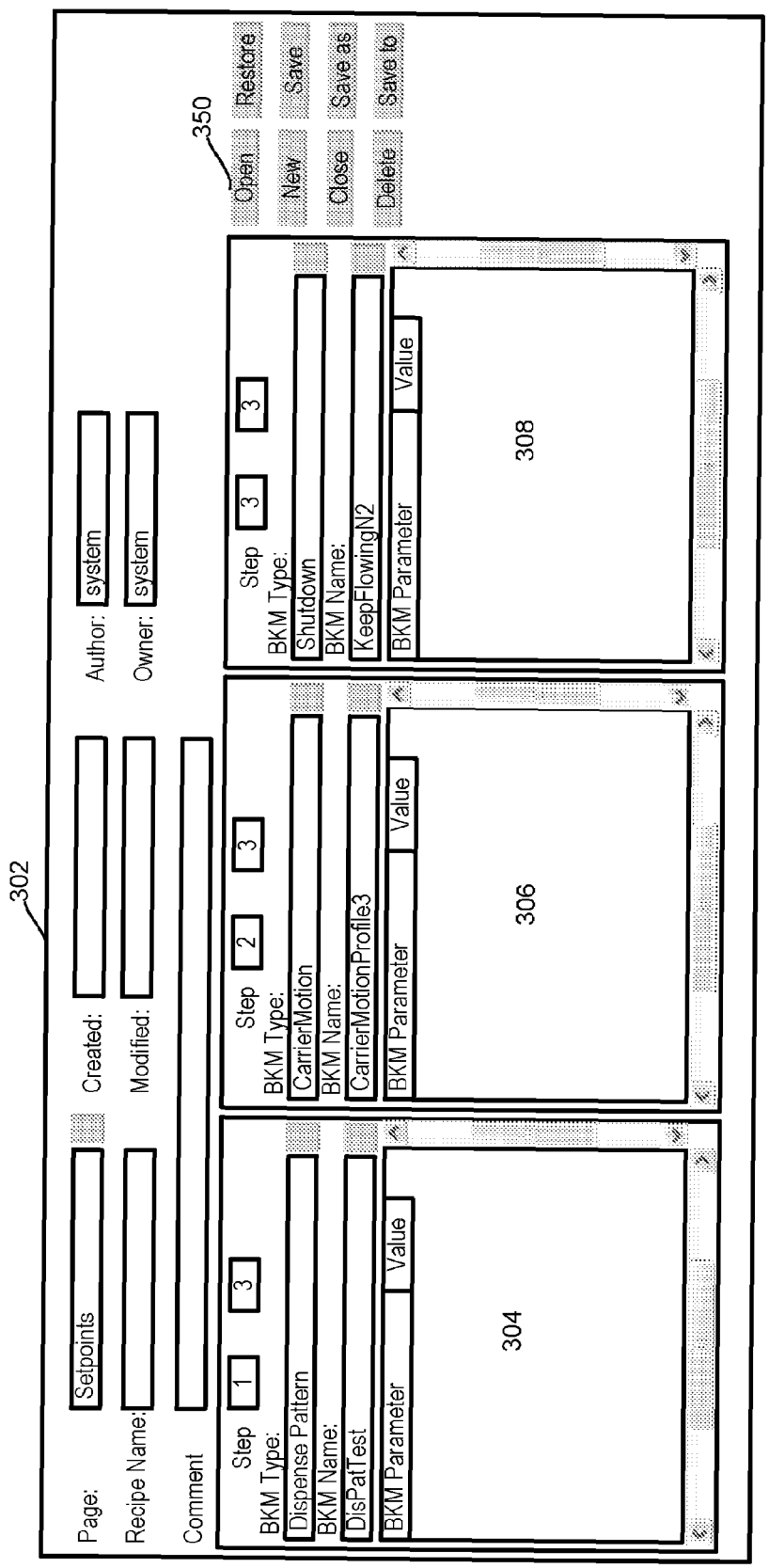
FIG. 3 shows, in an embodiment, an example of a main view of a BKM driven recipe editor interface.

As mentioned above, each BKM module may include best practice specifications. In addition, each BKM module may relate to a process stage and may include at least one recipe step. In creating a recipe, a user may utilize a BKM driven recipe editor to call forth a plurality of BKM modules. FIGS. 3, 4, and 5 illustrate examples of interfaces for a BKM driven recipe editor.

FIG. 3 shows, in an embodiment, an example of a main view of a BKM driven recipe editor interface. In the main view, an interface 302 shows a recipe with 3 BKM modules (304, 306, and 308). In an embodiment, the manufacturer of the processing system hardware may determine the number of BKM modules and the sequence of the BKM modules for each recipe. Accordingly, parameter value entry is assured to be conforming to the manufacturer's BKM if the BKM is followed. By clicking on a BKM module, such as BKM module 304, and clicking an "open" button 350, a user may call forth the parameters for BKM module 304.

FIG. 4 shows, in an embodiment, an example of a value view of a BKM driven recipe editor interface. In the value view, a user may enter values for each of the parameters within the guidelines of the BKM rules. An interface 402 shows a value view of BKM module 304 of FIG. 3. BKM module 304 may have a plurality of columns, including a parameter description column 404, a setpoint column 408, a soft tolerance column 410, and a hard tolerance column 412. The value of each cell may be changed within the guidelines of the rules (applicable to the cells and not shown in FIG. 4). Each of the cells for columns 408, 410 and 412 may include rules, which limit the permissible values that may be entered for each cell. (Refer to Table 1 below for examples of the rules). In an example, for a parameter cell 420 (Head Pair 1 Top DIW Flow), the default value for a setpoint cell 422 is set to "off". When the user click on setpoint cell 422, the user may change the value of the cell. However, the values that may be accepted for each cell may be limited by the rules that may be set for each parameter.

FIG. 5 shows, in an embodiment an example of a rule view of a BKM driven recipe editor. In the rule view, an expert may modify the rules for each of the parameter cells to customize a BKM module. As discussed above, an expert refers to a person who has been granted editor permission for creating new BKM modules or modifying current BKM modules. In an embodiment, the privilege for creating and/or modifying BKM is reserved only to personnel authorized by the tool manufacturer. An interface 502 shows a rule view of BKM module 304. BKM module 304 may have a plurality of columns, including a parameter description column 504, a setpoint column 508, a soft tolerance column 510, and a hard tolerance column 512. Each of the parameters shown in column 504 may not be added or removed by the user. However, the rules for columns 508, 510, and 512 may be modified if the expert is properly authorized. Refer to Table 1 below for examples of the rules. In an example, for a parameter cell 520 (HeadPair1TopDIWFlow), the rule for a setpoint cell 522 is set to default. When the user click on setpoint cell 522, a dialog box 524 may appear providing the user with information about the default value and also allowing the user to change the value of setpoint cell 522.

TABLE 1

Examples of Rules

| Rule | Description |
| --- | --- |
| Default | use the default value coded in the software |
| Exact | use the value specified in the BKM |
| UserBKM | allow the user to specify the value when creating a BKM |
| UserRecipe | allow the user to specify the value when using a BKM in a recipe |
| Previous | use the value from the previous step |
| Custom | custom logic for setting the value is coded in the BKM |

In an embodiment, the BKM driven recipe editor may have the ability to take BKMs (i.e., new best practices) that may be propagated by the production engineers or experts associated with the tool manufacturer and translate the BKMs into rules that may be applied to the cells of the affected parameters of the BKM modules. Thus, recipes may be created and/or modified with updated BKMs without requiring the user to be knowledgeable about the changes.

In an embodiment, the BKM-driven modification of existing recipes may be remotely triggered by the tool manufacturer and the resultant changes to the parameters are communicated to the tool user for approval and/or as a courtesy notification. In an embodiment, when BKMs are changed, the new BKM may be sent via a computer network (e.g., the internet) to the tool users (or to the tool directly) to be applied against existing recipes. An updated BKM may specify new parameters that may need to be included with an existing recipe or different permissible value ranges for existing parameters. This "BKM audit" may provide information to the tool user (or tool manufacturer, if access is allowed by the tool users) regarding whether one or more of the parameter values associated with an existing recipe may need to be modified in view of the changed BKM. In this manner, knowledge gained by the experts in one plant or by the tool manufacturer's experts may advantageously propagated in a manner that can be benefited by all tool users without threatening the confidentiality of the recipe of any particular tool users.

In another embodiment, BKM driven recipe editor may be utilized to accommodate the "proprietary recipe" of substrate manufacturers. Proprietary recipes may be closely guarded by their owners since they may give distinct advantage over competitors. By using the BKM driven recipe editor, experts may create new BKM modules and/or may manipulate current BKM modules to accommodate the proprietary recipes.

Figure 6:
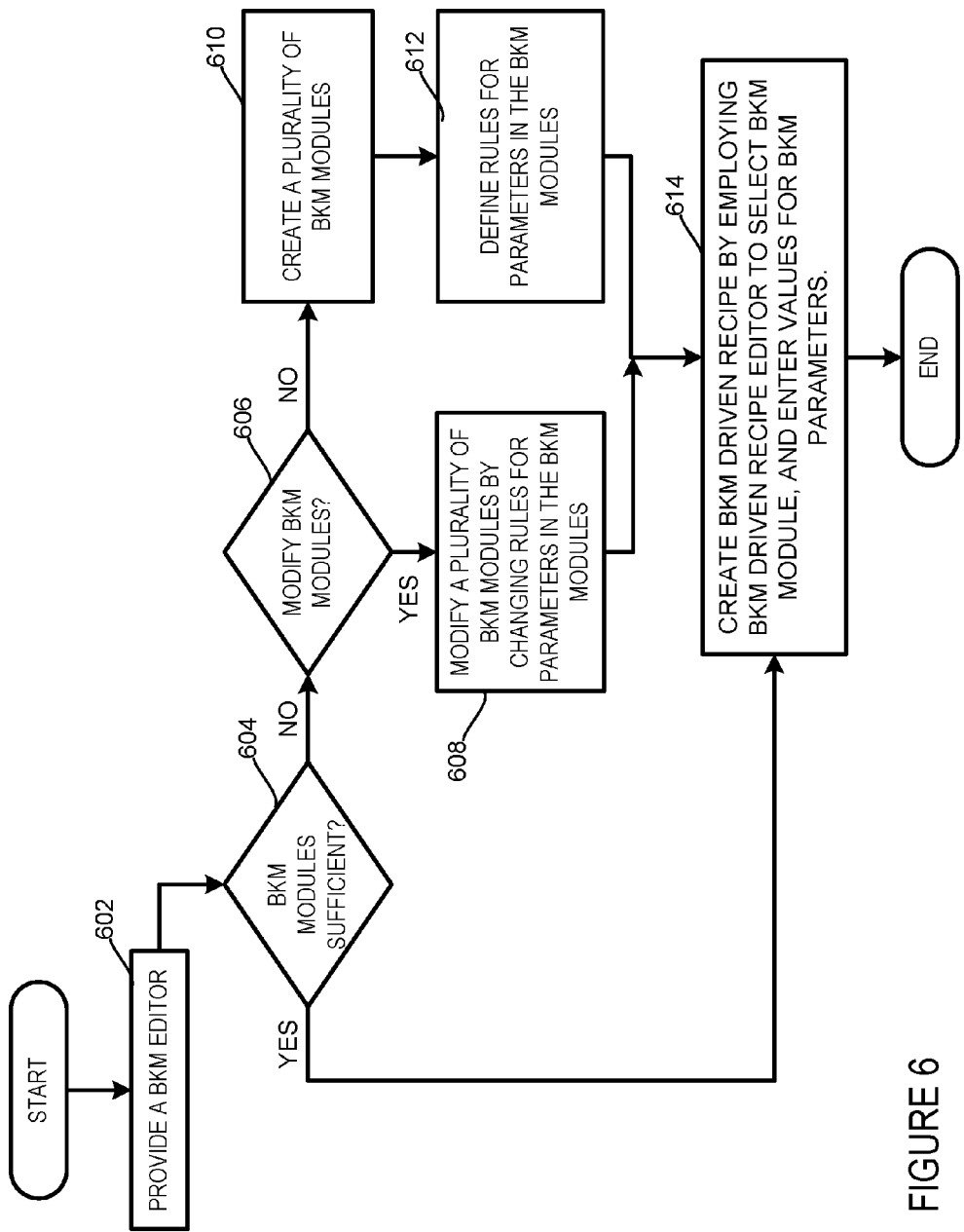
FIG. 6 shows, in an embodiment, a flow chart illustrating an example of how the BKM may be employed to create BKM driven recipe.

FIG. 6 shows, in an embodiment, a flow chart illustrating an example of how the BKM may be employed to create BKM driven recipe. At a first step 602, an expert associated with a tool owner may activate a BKM driven recipe editor. In an embodiment, the BKM driven recipe editor may include BKMs, which may include best practice specifications for recipes. For each recipe, the BKMs may be encapsulated within a plurality of BKM modules.

At a next step 604, if the BKM modules include BKMs that are sufficient for the creation of a recipe then the BKM modules may not have to be changed and an operator may create new recipe by employing the BKM driven recipe editor to enter values for the parameters within the guidelines of BKM rules, at a next step 614. In an example, the rules for the parameters of the BKM modules include best practice specifications. The BKM modules may be sufficient if an operator is able to create new BKM driven recipe without changing the rules of the parameters of one or more BKM modules. However, if the BKM modules are not sufficient at a next step 604, then the BKM modules may have to be modified or new BKM modules may have to be created. In an example, if the expert wants to implement proprietary recipes, the BKM modules with best practice specifications may not be sufficient and may require changes in the rules of the parameters of one or more BKM modules.

At a next step 606, the expert may choose to modify the existing BKM modules. If the expert chooses to modify one or more existing BKM modules, then at a next step 608, the expert may modify the rules for parameters (e.g., permissible values, dependency between parameters, etc.) in the existing BKM modules to accommodate the proprietary recipe. However, if at a next step 606, the expert does not choose to modify the existing BKM modules then the expert may choose to create new BKM modules, at a next step 610. At a next step 612, the expert may define the rules for parameters in the newly created BKM modules. The new BKM modules may be based on current BKM modules with rules to accommodate the proprietary recipe. Once the BKM modules have all the correct parameters and rules for creating a recipe, then at a next step 614, an operator may employ the BKM driven editor to enter values for each parameter to create a BKM driven recipe.

Figure 7:
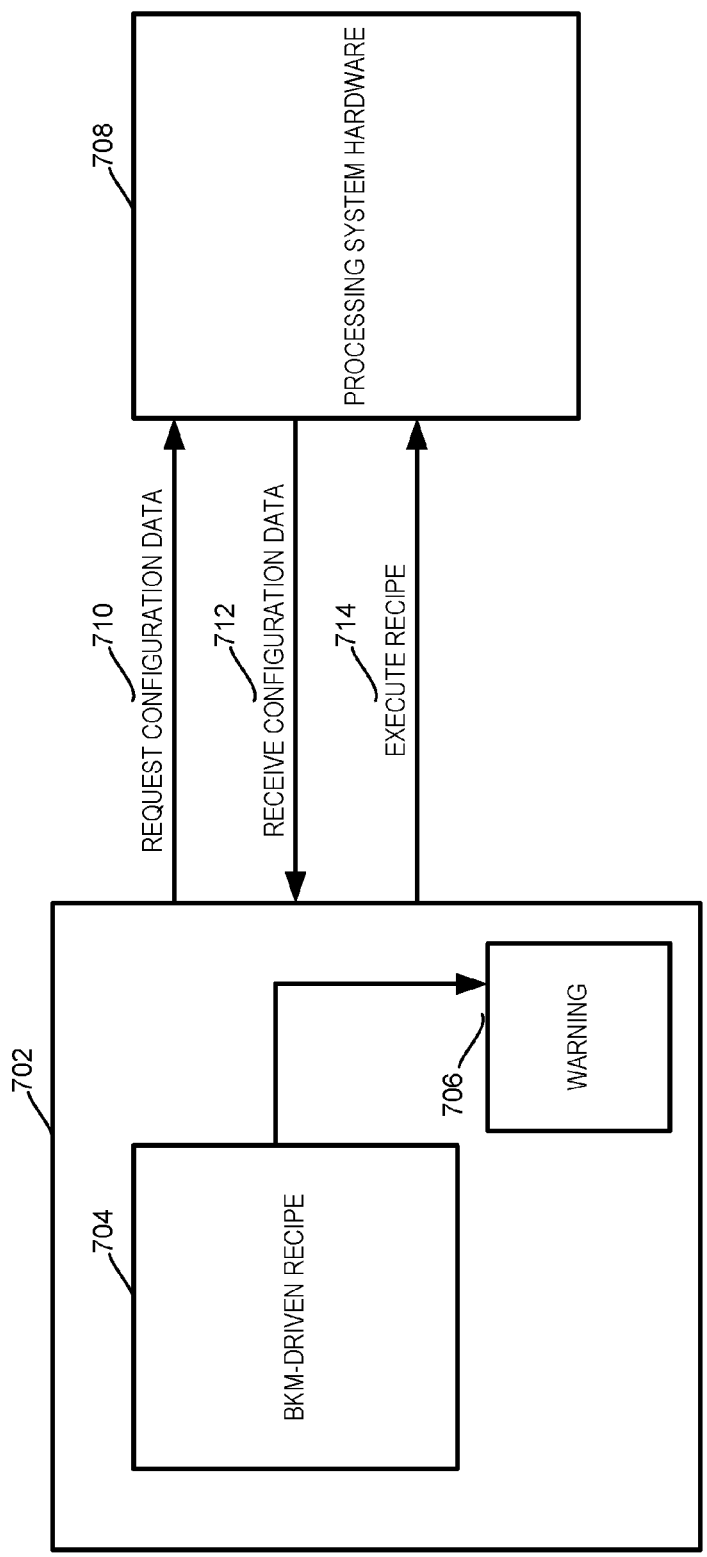
FIG. 7 shows, in an embodiment, a simplified block diagram illustrating the algorithm for applying a BKM driven recipe to a processing system hardware.

FIG. 7 shows, in an embodiment, a simplified block diagram illustrating the algorithm for applying a BKM driven recipe to processing system hardware 708. A PCM 702 may have BKM driven recipe 704 uploaded onto PCM 702. BKM driven recipe 704 may be generated by a BKM-driven recipe editor. In an embodiment, the BKM driven recipe editor may be located in PCM 702. In another embodiment, the BKM driven recipe editor may be located external to PCM 702. BKM driven recipe editor may request data about actual configuration setting from a processing system hardware 708 in a 710. Processing system hardware 708 may send requested configuration data to PCM 702 in a step 712. With the configuration data, PCM 702 may determine if BKM driven recipe 704 is compatible with the processing system hardware 708. If the recipe is not compatible with the configuration settings then a warning 706 may be provided enabling the user to modify the BKM driven recipe 704 or modify the hardware configuration setting. However, if the data is compatible, then PCM 702 may execute the recipe by sending the recipe to processing system hardware 708 in a step 714.

As can be appreciated from embodiments of the invention, a BKM driven recipe editor "de-skill" a user by removing the need for a user to have expert knowledge of the recipe and the configuration settings of the processing system hardware, resulting in significant reduction of labor and material cost for the manufacturers. Specifically, manufacturers may no longer be susceptible to erroneous data input by users as rules are incorporated into the BKM driven recipe editor to reject or accept user's entry; thus, the volume of costly substrate waste may be reduced as "de-skilled" users are limited to valid data that may be entered for a particular parameter.

While this invention has been described in terms of several embodiments, there are alterations, permutations, and equivalents, which fall within the scope of this invention. Also, the title, summary, and abstract are provided herein for convenience and should not be used to construe the scope of the claims herein. Further, in this application, a set of "n" refers to one or more "n" in the set. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for facilitating creation of at least a recipe for processing at least a substrate in at least a processing system, the method comprising:
   providing a recipe editor, said recipe editor incorporating best-known methods (BKMs), said BKMs being practice specifications for said recipe;
   creating a plurality of BKM modules based on said BKMs for said recipe, wherein each BKM module of said plurality of BKM modules relates to a process stage for processing said substrate and includes a plurality of recipe steps of said recipe;
   defining rules for parameters in said plurality of BKM modules;
   translating, using said recipe editor, user-propagated parameter values into updated rules; said user-propagated parameter values being propagated by a first user in at least one of said processing system and said plurality of BKM modules;
   generating at least an updated BKM module using said updated rules; and
   providing said updated BKM module to at least a second processing system that is used by a second user.

2. The method of claim 1 wherein said updated BKM module specifies additional parameters for said recipe in addition to said parameters.

3. The method of claim 1 wherein said updated BKM module includes one or more updated permissible value ranges for one or more of said parameters.

4. The method of claim 1 wherein said rules define permissible values for said parameters.

5. The method of claim 4 wherein said rules define dependency between said parameters.

6. The method of claim 4 wherein said rules are automatically updated by said BKMs.

7. The method of claim 1 wherein said recipe editor includes recommended configuration settings for said processing system.

8. The method of claim 1 wherein said recipe editor requests actual configuration settings of said processing system before executing said recipe, wherein a comparison between said actual configuration settings and said recipe is performed.

9. The method of claim 8 wherein said recipe editor issues a warning when said comparison indicates incompatibility between said actual configuration settings and said recipe.

10. A system for facilitating creation of at least a recipe for processing at least a substrate in at least a processing system, the system comprising:
    a computing device;
    a recipe editor implemented in said computing device, said recipe editor incorporating best-known methods (BKMs), said BKMs being practice specifications for said recipe;
    a plurality of BKM modules based on said BKMs for said recipe, wherein each BKM module or said plurality of BKM modules relates to a process stage for processing said substrate and includes a plurality of recipe steps of said recipe; and
    rules for defining parameters in said plurality of BKM modules,
    wherein said recipe editor is configured to translate user-propagated parameter values into updated rules, said user-propagated parameter values being propagated by a first user in at least one of said processing system and said plurality of BKM modules;
    said computing device is configured to generate at least an updated BKM module using said updated rules, and
    said computing device is further configured to provide said updated BKM module to at least a second processing system that is used by a second user.

11. The system of claim 10 wherein said updated BKM module specifies additional parameters for said recipe in addition to said parameters.

12. The system of claim 10 wherein said updated BKM module includes one or more updated permissible value ranges for one or more of said parameters.

13. The system of claim 10 wherein said rules define permissible values for said parameters.

14. The a system of claim 13 wherein said rules define dependency between said parameters.

15. The system of claim 13 wherein said rules are automatically updated by said BKMs.

16. The system of claim 10 wherein said recipe editor includes recommended configuration settings for said processing system.

17. The system of claim 10 wherein said recipe editor creates a BKM driven recipe after receiving value inputs for said parameters.

18. The system of claim 17 wherein said recipe editor requests actual configuration settings of said processing system before executing said BKM driven recipe, wherein a comparison between said actual configuration settings and said BKM driven recipe is performed.

19. The system of claim 18 wherein said driven recipe editor issues a warning when said comparison indicates incompatibility between said actual configuration settings and said BKM driven recipe.

20. An article of manufacture comprising a program storage medium having computer readable code embodied therein, said computer readable code being configured to facilitating creation of at least a recipe for processing at least a substrate in at least a processing system, the article of manufacture comprising:
   computer readable code for creating a recipe editor, said best-known method driven recipe editor incorporating best-known methods (BKMs), said BKMs being practice specifications for said recipe;
   computer readable code for creating a plurality of BKM modules based on said BKMs for said recipe, wherein each BKM module of said plurality of BKM modules relates to a process stage for processing said substrate and includes a plurality of recipe steps of said recipe;
   computer readable code for applying rules in defining parameters in said plurality of BKM modules;
   computer readable code for translating, using said recipe editor, user-propagated parameter values into updated rules, said user-propagated parameter values being propagated by a first user in at least one of said processing system and said plurality of BKM modules;
   computer readable code for generating at least an updated BKM module using said updated rules; and
   computer readable code for providing said updated BKM module to at least a second processing system that is used by a second user.

21. The article of manufacture of claim 20 wherein said updated BKM module specifies additional parameters for said recipe in addition to said parameters.

22. The article of manufacture of claim 20 wherein said updated BKM module includes one or more updated permissible value ranges for one or more of said parameters.

23. The article of manufacture of claim 20 wherein said rules define permissible values for said parameters.

24. The article of manufacture of claim 23 wherein said rules define dependency between said parameters.

25. The article of manufacture of claim 20 wherein said rules are automatically updated by said BKMs.

26. The article of manufacture of claim 20 wherein said recipe editor includes recommended configuration settings for said processing system.

27. The article of manufacture of claim 20 wherein said recipe editor creates a BKM driven recipe after receiving value inputs for said parameters.

28. The article of manufacture of claim 27 wherein said recipe editor requests actual configuration settings of said processing system before executing said BKM driven-recipe, wherein a comparison between said actual configuration settings and said BKM driven recipe is performed.

29. The article of manufacture of claim 27 wherein said recipe editor issues a warning when said comparison indicates incompatibility between said actual configuration settings and said BKM driven recipe.

* * * * *